United States Patent

[11] 3,629,670

[72] Inventors Ronald J. Perusek
Chardon;
Ralph M. Potter, Pepper Pike, both of Ohio
[21] Appl. No. 74,545
[22] Filed Sept. 23, 1970
[45] Patented Dec. 21, 1971
[73] Assignee General Electric Company

[54] ELECTRICAL CONTACT TO SILICON CARBIDE
8 Claims, 1 Drawing Fig.

[52] U.S. Cl. .......... 317/237, 317/234, 29/576
[51] Int. Cl. .......... H01l 1/14
[50] Field of Search .......... 317/234, 237, 238

[56] References Cited

UNITED STATES PATENTS

| | | | |
|---|---|---|---|
| 1,658,647 | 2/1928 | Miller | 317/237 |
| 1,708,571 | 4/1929 | Hartmann et al. | 317/237 |
| 1,733,519 | 10/1929 | Summers | 317/237 |
| 1,994,632 | 3/1935 | Becker | 317/241 |
| 2,273,704 | 2/1942 | Grisdale | 317/234 X |

*Primary Examiner*—James D. Kallam
*Attorneys*—Norman C. Fulmer, Henry P. Truesdell, Frank L. Neuhauser, Oscar B. Waddell and Joseph B. Forman

ABSTRACT: Yttrium metal provides a low-resistance electrical contact to a silicon carbide wafer, useful in the manufacture of solid-state lamps. A preferred method comprises the steps of placing a small piece of yttrium on a silicon carbide wafer, and heating to cause fusion to occur.

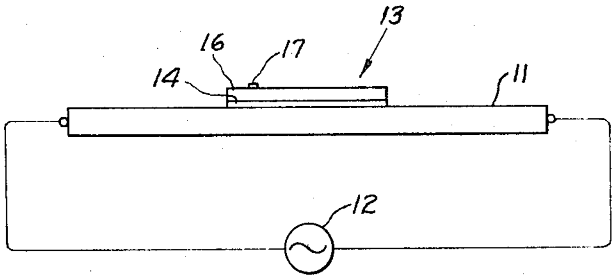
Inventors:
Ronald J. Perusek
Ralph M. Potter
by Norman C. Fulmer
Their Attorney

ELECTRICAL CONTACT TO SILICON CARBIDE

BACKGROUND OF THE INVENTION

The invention is in the field of silicon carbide devices having electrical contacts applied to silicon carbide, such as used in solid-state lamps.

Solid-state lamps may be made from various materials, including silicon carbide. U.S. Pat. No. 3,458,779, to Drs. Blank and Potter (assigned to the same assignee as the present invention) describes a silicon carbide lamp, in which a wafer of silicon carbide having a PN-junction is attached at its P-side to a metal header to form one electrical connection to the lamp, and the other electrical connection is made by fusing a small piece of gold-tantalum alloy ("dot" size) to the N-side of the silicon carbide wafer. Although such a "dot" contact is generally satisfactory, it sometimes has a high electrical resistance (up to 100 ohms) which reduces the electrical efficiency of the lamp, and, also, such contacts are somewhat weak mechanically. Some other metals, such as nickel, nicklechrome, niobium, and vanadium, have been employed, and a multiple-layer contact of nickel, titanium, and gold, placed in the named order on the silicon carbide wafer, has also been used. All of the foregoing contacts have, for some purposes, undesirably high electrical resistance and weak mechanical adherence.

SUMMARY OF THE INVENTION

Objects of the invention are to provide an improved electrical contact to silicon carbide, and to provide such a contact that has low electrical resistance and high mechanical adherence strength.

The invention comprises, briefly and in a preferred embodiment, the use of yttrium as an electrical contact material for silicon carbide. Preferably a small "dot" of yttrium is placed on a wafer of silicon carbide, and the combination is heated until fusion occurs, in an inert atmosphere such as argon or argon containing nitrogen.

BRIEF DESCRIPTION OF THE DRAWING

The single FIGURE of the drawing is a side view of a preferred arrangement for carrying out the invention.

DESCRIPTION OF THE PREFERRED EMBODIMENT

Referring to the drawing, a carbon heater strip 11 is heated by a source 12 of electrical energy. A wafer 13 of silicon carbide, shown as having a PN-junction at the interface of an N-type region 16 and a P-type region 14, is placed, P-side down, on the heater strip 11. A small "dot" of yttrium metal 17 (generally only a few mils in diameter) is placed on the N-side of the wafer 13 where electrical contact is desired to be made. The heater strip 11 is heated, by electric current from source 12, to cause fusion of the yttrium 17 with the silicon carbide wafer 13.

The aforesaid heating and fusion preferably is carried out in an atmosphere of inert gas, such as argon, or argon containing nitrogen. The wafer is heated to about 2,100° C. until the fusion commences, and then the temperature is reduced to about 1,650° C. for a few seconds, and then allowed to cool to room temperature.

The process, and the use of yttrium as the contact material, achieves an improved electrical contact having a relatively low resistance (about 1 ohm) and increased mechanical adherence to the silicon carbide wafer. The mechanism of achieving the improved contact is believed to be the dissolving of some of the silicon carbide in the yttrium at the peak fusing temperature, followed by regrowth of a thin layer of silicon carbide at the contact interface during the cooling period. Nitrogen present in the ambient atmosphere will tend to dissolve in the molten yttrium and to dope the regrown layer strongly N-type, thus helping to guarantee a low-resistance contact. (However, nitrogen in the ambient is not necessary for a low-resistance contact.)

The wafer 13 may be further processed, mounted on a header, and connected to electrical lead wires, as described in the above-mentioned U.S. Pat. No. 3,458,779.

While a preferred embodiment of the invention, and method for carrying it out, have been described, other embodiments and modifications thereof will become apparent to persons skilled in the art, and will fall within the scope of invention as defined in the following claims.

What we claim as new and desire to secure by Letters Patent of the United States is:

1. An electrical contact to silicon carbide, comprising yttrium metal in contact with the silicon carbide.

2. A contact as claimed in claim 1, in which said yttrium metal is in fusion contact with said silicon carbide.

3. A contact as claimed in claim 1, in which said silicon carbide is in the form of a wafer having a PN-junction at the interface of a P-type region and an N-type region, said contact being positioned at the surface of said N-type region.

4. A method of making an electrical contact to silicon carbide, comprising the steps of placing a piece of yttrium metal on said silicon carbide, and heating the combination to cause fusion of the yttrium with the silicon carbide.

5. A method as claimed in claim 4, in which said heating comprises bringing the combination to a temperature of about 2,100° C. until fusion commences, reducing the temperature to about 1,650° C. for a few seconds, and allowing to cool.

6. A method as claimed in claim 5, in which said heating is carried out in an atmosphere of argon.

7. A method as claimed in claim 5, in which said heating is carried out in an atmosphere of argon containing nitrogen.

8. A method as claimed in claim 4, in which said silicon carbide is in the form of a wafer having a PN-junction at the interface of a P-type region and an N-type region, said piece of yttrium being placed on the surface of said N-type region.

* * * * *